INVENTOR.
NORMAN C. LUDWIG
BY Donald G. Dalton
ATTORNEY

INVENTOR.
NORMAN C. LUDWIG
BY Donald G. Dalton
ATTORNEY

United States Patent Office 3,027,099
Patented Mar. 27, 1962

3,027,099
PROPORTIONING CONTROL SYSTEM
Norman C. Ludwig, Chicago, Ill., assignor to United States Steel Corporation, a corporation of New Jersey
Filed May 16, 1960, Ser. No. 29,285
7 Claims. (Cl. 241—33)

This invention relates to an improved apparatus for proportioning materials.

My apparatus is particularly useful in the manufacture of cement for proportioning water and aqueous solutions of additives, such as air-entraining agents or grinding aids. After cement clinker discharges from kilns in which it is formed, conventional practice is to cool it, mix it with gypsum and grind the mixture in ball mills to the necessary fineness. Drag chain feeders commonly are used for carrying a mixture of clinker and gypsum to the ball mills. Water and additives are introduced to the mixture, either on the feeders or in the ball mills, and the proportions must be carefully controlled. For convenience I describe my apparatus as used for this purpose in the manufacture of cement, but it is apparent the invention is not thus limited and that the apparatus can be used elsewhere for accomplishing the same purpose.

An object of the invention is to provide an improved proportioning apparatus which controls introduction of one or several materials to several units operating in parallel, thus avoiding need for duplicate proportioning equipment for each unit.

A further object is to provide a proportioning apparatus which automatically operates in accordance with the combined weight of material in several parallel feeders in controlling introduction of one or more materials up to six.

A further object, as applied to cement manufacture, is to provide an improved proportioning apparatus which controls the introduction of water and additives to a mixture of clinker and gypsum in several ball mills operating in parallel without duplicating the proportioning apparatus for each ball mill.

A further object is to provide an improved proportioning apparatus which has the foregoing features and yet comprises essentially a combination of standard commercially available components.

Figure 1:
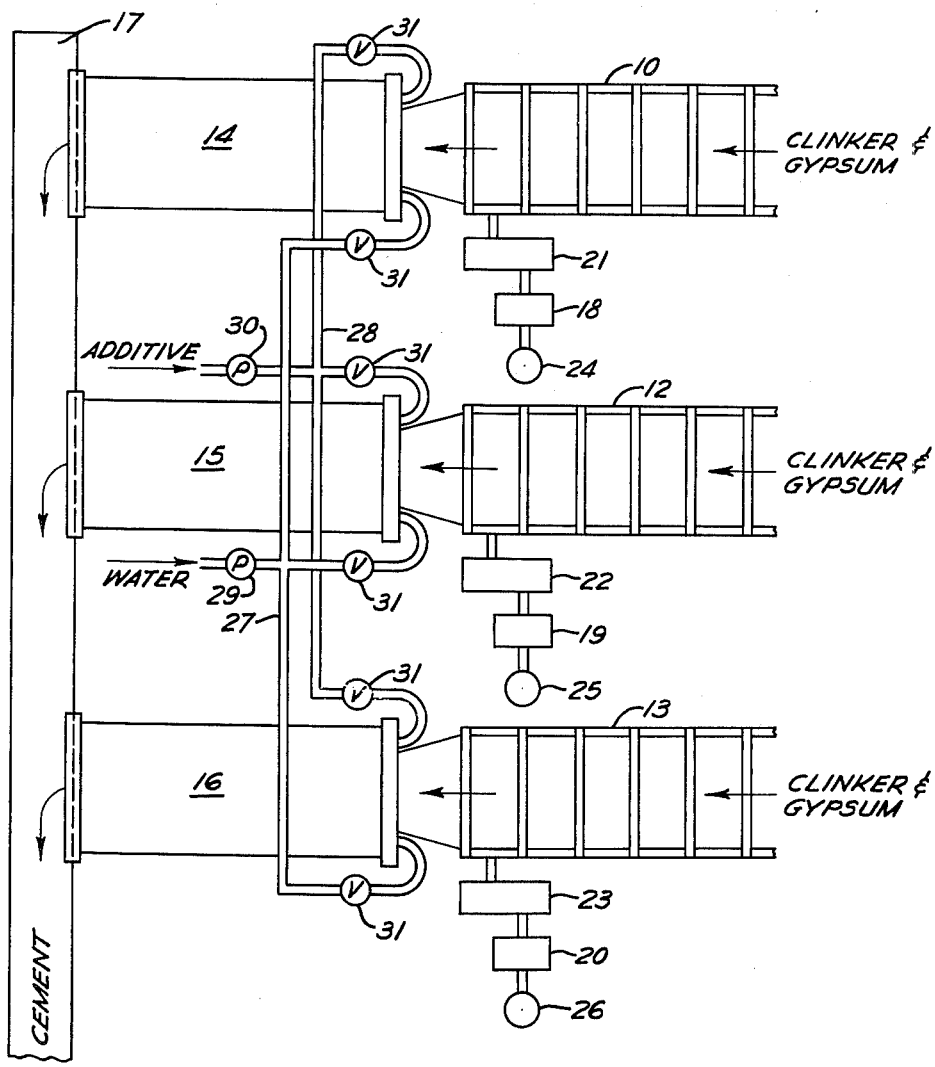
Figure 2:
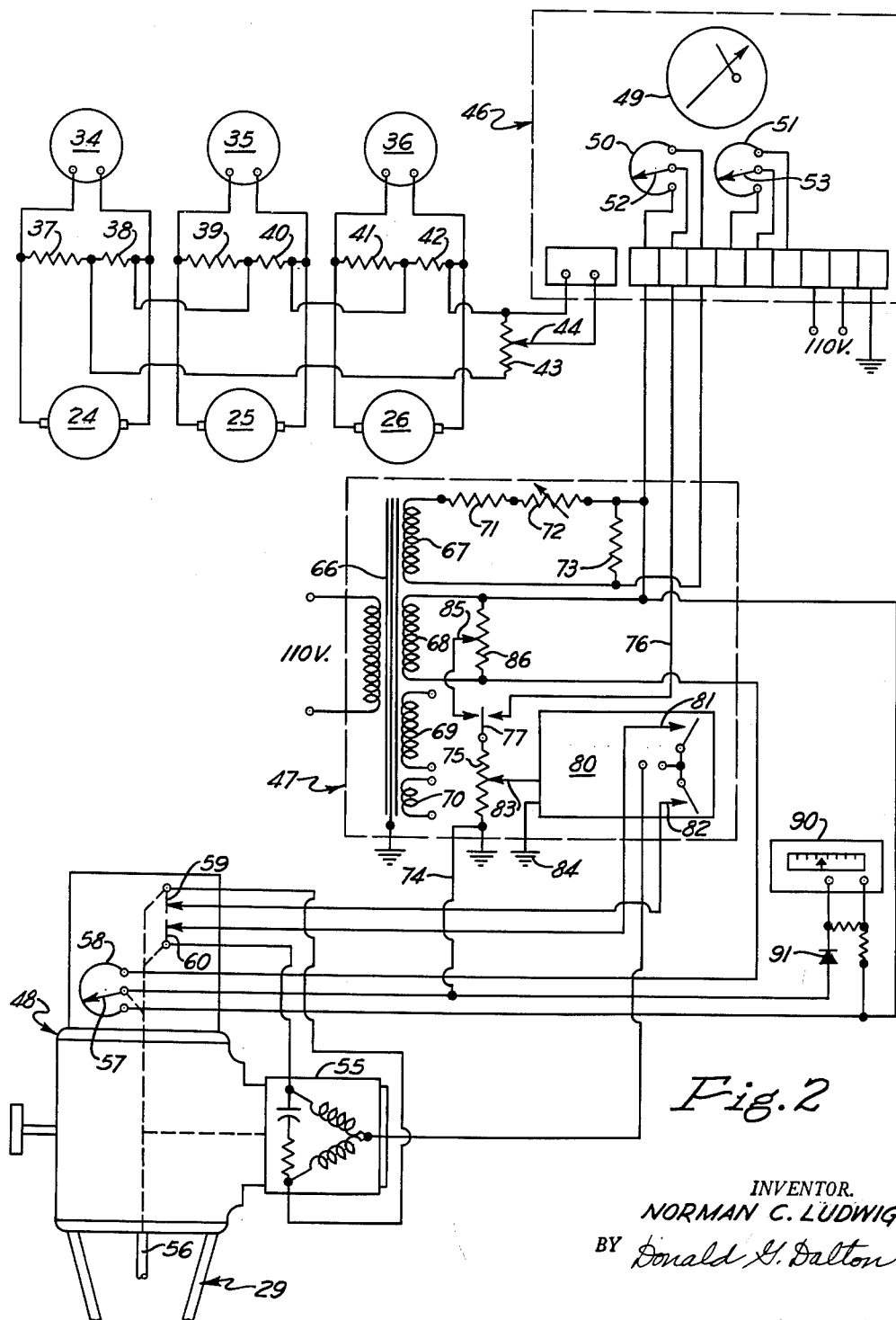

In accomplishing these and other objects of the invention, I have provided improved details of structure, a preferred form of which is shown in the accompanying drawings, in which:

FIGURE 1 is a diagrammatic plan view of a portion of a cement manufacturing layout equipped with a proportioning apparatus constructed in accordance with my invention; and FIGURE 2 is a schematic wiring diagram of my proportioning apparatus.

FIGURE 1 shows a portion of a typical cement manufacturing layout which includes three parallel drag chain feeders 10, 12 and 13, three ball mills 14, 15 and 16, and a common receiving conveyor 17. Drive motors 18, 19 and 20 are connected to the respective drag chains 10, 12 and 13 through reduction gearing 21, 22 and 23. The drag chains carry a mixture of cement clinker and gypsum into the respective ball mills 14, 15 and 16, which have conventional drives, not shown. The common conveyor 17 receives finely ground cement from the three ball mills, blends it, and carries it away for storage or packaging. D.-C. tachometer-generators 24, 25 and 26 the mechanically connected to the respective drag chain motors 18, 19 and 20. The weight of clinker and gypsum which each drag chain carries to its respective ball mill is approximately proportional to its speed; hence the voltage which each generator develops affords a measure of the weight of mixture going into the corresponding ball mill.

Water and additive (for example, aqueous solution of an air-entraining agent) are introduced to the ball mills through pipes 27 and 28 respectively. These pipes are connected to the discharge sides of pumps 29 and 30 respectively, preferably of a conventional diaphragm type which delivers an absolute volume and whose output is varied by changing its stroke length. The intake sides of the pumps are connected to suitable sources of water and additive, not shown. Each pipe 27 and 28 has three branches which lead to the respective ball mills. Each branch is equipped with a shut-off valve 31 for stopping flow to any ball mill which is not in operation. Optionally water and additives can be introduced to the clinker and gypsum while they are on the drag chain, but I prefer to introduce these materials directly to the ball mills by use of spray nozzles, since the additives blend more rapidly and the water evaporates sooner.

In accordance with my invention as shown in FIGURE 2, the three tachometer-generators 24, 25 and 26 are connected to respective voltmeters 34, 35 and 36, which indicate the speed of each drag chain. High and low resistances 37 and 38 respectively are connected in series across the lines which extend between generator 24 and its voltmeter 34. High and low resistances 39 and 40 of the same values are connected across the lines from generator 25, and high and low resistances 41 and 42 of the same values are connected across the lines from generator 26. Thus the voltage which each generator develops produces a small but proportionate current flow through its respective high and low resistances. In each instance the voltage appearing across the low resistance is proportionate to the magnitude of current passing therethrough. The three low resistances 38, 40 and 42 are themselves connected in series in a circuit, the terminals of which are connected to the resistance element 43 of a calibrating potentiometer. Thus the voltage applied across resistance 43 is proportionate to the sum of the voltages developed by the three generators. The calibrating potentiometer has an adjustable arm 44, which contacts its resistance 43.

The voltage between the arm 44 and one end of resistance 43 of the calibrating potentiometer is proportional to the combined weight of material going into the three ball mills 14, 15 and 16. I utilize this voltage as a signal for controlling the output of pumps 29 and 30, whereby the output of each pump is proportional to the combined weight. I can employ any suitable conventional means for transmitting this signal to the pumps and varying the pump output according to variations in the signal. The means illustrated includes a potentiometric recorder 46 equipped with a plurality of control slide wires, a proportional relay 47, and a positioner 48 on the pump itself. These components of my apparatus are standard items available commercially. Therefore I am not encumbering my disclosure with an unnecessary showing of their details, but show only enough of their structure diagrammatically to explain the operation of my invention.

Arm 44 and one end of resistance 43 of the calibrating potentiometer are connected to the respective input terminals of recorder 46. The recorder includes a scale 49 preferably calibrated to show directly the rate at which clinker and gypsum are carried to the ball mills, which of course is the grinding rate. The recorder also includes at least two control slide wires 50 and 51 mounted on the same shaft that turns the recorder pointer, and fixed contact arms 52 and 53. Slide wire 50 and arm 52 are in the water-proportioning circuit, while slide wire 51 and arm 53 are in the additive-proportioning circuit, as hereinafter explained. If the apparatus is used to proportion more than two materials, the recorder can be equipped with additional slide wires and arms, commonly up to as many as six. As is well-known in the potentiometric recorder controller art, the balance motor of the recorder automatically positions the slide wires in accordance with the magnitude of the voltage applied to its input terminals. If this voltage changes, the motor moves the slide wires to a new position with respect to the stationary arms.

FIGURE 2 shows diagrammatically the circuit for controlling the water pump 29. Since the circuit for controlling the additive pump 30 is similar, the diagram is not repeated. The positioner 48 forms part of pump 29 and it includes a conventional reversible split phase A.-C. motor 55 and a pump stroke positioner shaft 56 connected to the pumping mechanism, not shown. When motor 55 is energized, it moves shaft 56 up or down to change the pump stroke length. The contact arm 57 of a drive unit slide wire 58 is mechanically connected to motor 55 and is positioned in accordance with the position of shaft 56. In this case the slide wire 58 remains stationary. The positioner also includes upper and lower limit switches 59 and 60 adapted to be engaged by shaft 56 at the limits of its travel for preventing overtravel.

The proportional relay 47 is connected between recorder 46 and the pump positioner 48. The relay includes a transformer 66 whose primary winding is connected to a suitable A.-C. source and which has four secondary windings 67, 68, 69 and 70. One secondary winding 67 is connected to opposite ends of the control slide wire 50 in recorder 46. This circuit includes a fixed resistor 71 and a variable resistor 72 in series with slide wire 50 and a fixed resistor 73 in parallel therewith. Another secondary winding 68 is connected to opposite ends of the slide wire 58 in the pump positioner 48. A grounded conductor 74 connects contact arm 57 in the pump positioner 48 with one end of a resistance 75 in the proportional relay. A conductor 76 connects the other end of resistance 75 with the contact arm 52 in recorder 46 through a "manual-automatic" switch 77 in the proportional relay. Thus when switch 77 is on "automatic," the two slide wires 50 and 58 and the resistance 75 form a bridge circuit. When the bridge is in balance, no current flows through resistance 75. If a change in the voltage output of one or more of the tachometer-generators 24, 25 or 26 changes the position of slide wire 50 with respect to arm 52, the bridge is unbalanced. Current flows through the resistance 75 until mechanism hereinafter described produces a corresponding change in the position of arm 57 with respect to slide wire 58.

The proportional relay 47 also includes a conventional amplifier 80 and reversing relays whose normally open contacts are indicated at 81 and 82. The secondary windings 69 and 70 of transformer 65 supply power to this amplifier. The resistance 75 has a cooperating arm 83 connected to the amplifier, which also has a ground connection 84. When the bridge is unbalanced and current flows through resistance 75, there is a voltage drop between the point at which arm 83 contacts the resistance and the ground 84. This voltage is impressed on amplifier 80 and causes it to close one of the contacts 81 or 82, depending on the direction of unbalance. Closing of contact 81 or 82 completes a circuit from the input voltage to the positioner motor 55, whereupon the motor runs in the proper direction to move arm 57 toward a position which balances the bridge. This action of course adjusts the length of the pump stroke to compensate for the changed weight carried by the drag chains. When the bridge again balances, contact 81 or 82 opens and motor 55 stops.

If switch 77 is set to "manual," arm 57 is disconnected from arm 52, and in place of arm 52 is now connected to a manually adjustable arm 85 of a resistance 86 of the proportional relay. Resistance 86 is connected across the secondary winding 68. Resistance 86, slide wire 58 and resistance 75 form a bridge circuit which operates in the same manner as the "automatic" bridge circuit already described, except that the "manual" bridge can be unbalanced by manually adjusting arm 85. The amplifier 80 and pump positioner motor 55 react in the same manner to restore the bridge to balance.

A voltmeter 90 is connected between conductor 74, which leads to arm 57, and the conductor which leads to one end of the slide wire 58. A rectifier and calibrating resistance 91 are connected in the voltmeter circuit. The difference in potential between these conductors affords a measure of the setting of arm 57 and thus measures the rate at which pump 29 is delivering water. The voltmeter preferably is calibrated to indicate the flow rate in terms of gallons per hour or other direct terms.

In a typical example, each of the high resistances 37, 39 and 41 can be about 33,000 ohms, and each of the low resistances 38, 40 and 42 about 10 ohms. Voltmeters 34, 35 and 36 are calibrated to indicate the drag chain speed in terms of percent of maximum. The speed of the drag chains ranges from about 25 to 40 percent of maximum depending on the fineness to which the ball mills are grinding. The sum of the voltages appearing across the low resistances ranges from about 30 millivolts for 25 percent speed to 50 millivolts for 40 percent speed. The feed rate recorder scale 49 is calibrated from 0 to 500 barrels per hour grinding rate. The position of the potentiometer arm 44 can be adjusted to assure an accurate reading on scale 49. The proportion of material added can be varied by manually changing the position of adjustment of the variable resistance 72. In a parallel system of this sort the resistances 72 of the different proportional relays are of course independently adjustable. Thus I can vary the proportion of each added material independently of the others, and yet control all from the same tachometer signal.

From the foregoing description it is seen that my invention affords a simple apparatus which controls the proportioning of a number of different materials to several production lines operating in parallel. If there is any unevenness in the way added materials enter the various lines, the final product becomes uniform, since the output from all the lines is blended on the common conveyor.

While I have shown and described only a single embodiment of my invention, it is apparent that modifications may arise. Therefore, I do not wish to be limited to the disclosure set forth but only by the scope of the appended claims.

I claim:

1. In a production layout which includes a plurality of units operating in parallel and each carrying a similar first material, means for addng a second material to the first material in each unit, and a common receiver in which the combined materials from all the units are blended, the combination therewith of an apparatus for proportioning the second material comprising means for developing voltages proportional to the weight of the first material carried by each unit, means for combining the individual voltages and thus obtaining a voltage signal proportional to the combined weight of the first material carried by said units, and means for controlling the quantity of the second material in accordance with said signal.

2. In a production layout which includes a plurality of units operating in parallel and each carrying a similar first material, the weight of the first material carried by each unit being approximately proportional to the respective line speeds, means for adding a second material to the first material in each unit, and a common receiver in which the combined materials from all the units are blended, the combination therewith of an apparatus for proportioning the second material comprising means for developing voltages proportional to the speed of each unit, means for combining the individual voltages and thus obtaining a voltage signal proportional to the combined weight of the first material carried by said units, and means for controlling the quantity of the second material in accordance with said signal.

3. In a cement manufacturing layout which includes a plurality of ball mills, respective feeders for carrying a mixture of cement clinker and gypsum to said ball mills, the weight of mixture carried by each feeder being approximately proportional to the respective feeder speeds, means for introducing another material to the mixture in each ball mill, and a common conveyor for receiving and blending finely ground cement from said ball mills, the combination therewith of an apparatus for proportioning the other material comprising means for developing voltages proportional to the speed of each feeder, means for combining the individual voltages and thus obtaining a voltage signal proportional to the combined weight of mixture carried by said feeders, and means for controlling the quantity of the other material in accordance with said signal.

4. In a cement manufacturing layout which includes a plurality of ball mills, respective feeders for carrying a mixture of cement clinker and gypsum to said ball mills, the weight of mixture carried by each feeder being approximately proportional to the respective feeder speeds, a pump and connecting pipes for introducing a fluid to the mixture in each ball mill, and a common conveyor for receiving and blending finely ground cement from said ball mills, the combination therewith of an apparatus for proportioning the fluid comprising means for developing voltages proportional to the speed of each feeder, means for combining the individual voltages and thus obtaining a voltage signal proportional to the combined weight of mixture carried by said feeders, and means operatively connected with said pump for controlling the output of fluid therefrom in accordance with said signal.

5. In a cement manufacturing layout which includes a plurality of ball mills, respective feeders for carrying a mixture of cement clinker and gypsum to said ball mills, the weight of mixture carried by each feeder being approximately proportional to the respective feeder speeds, a pump and connecting pipes for introducing a fluid to the mixture in each ball mill, and a common conveyor for receiving and blending finely ground cement from said ball mills, the combination therewith of an apparatus for proportioning the fluid comprising tachometer-generators operatively connected with the respective feeders for developing voltages proportional to the feeder speeds, means connected to said generators for developing a combined voltage proportional to the sum of the individual voltages developed by each, said combined voltage affording a signal proportionate to the combined weight of mixture carried by said feeders, and means operatively connected with said pump for controlling the output of fluid therefrom in accordance with said signal.

6. In a cement manufacturing layout which includes a plurality of ball mills, respective feeders for carrying a mixture of cement clinker and gypsum to said ball mills, the weight of mixture carried by each feeder being approximately proportional to the respective feeder speeds, a pump and connecting pipes for introducing a fluid to the mixture in each ball mill, and a common conveyor for receiving and blending finely ground cement from said ball mills, the combination therewith of an apparatus for proportioning the fluid comprising tachometer-generators operatively connected with the respective feeders for developing voltages proportional to the feeder speeds, respective high and low resistances connected in series across each tachometer-generator to produce voltage drops therethrough proportional to the voltages developed by the respective generators, means connecting said low resistances in series with one another to form a circuit in which the voltage is proportionate to the sum of the voltages developed by said generators and furnishes a signal proportionate to the combined weight of mixture carried by said feeders, and means operatively connected with said pump for controlling the output of fluid therefrom in accordance with said signal.

7. In a production layout which includes a plurality of units operating in parallel and each carrying a similar first material, means for adding a plurality up to six other materials to the first material in each unit, and a common receiver in which the combined materials from all the units are blended, the combination therewith of an apparatus for proportioning the added materials comprising means for developing voltages proportional to the weight of the first material carried by each unit, means for combining the individual voltages and thus obtaining a voltage signal proportional to the combined weight of the first material carried by said units, and individually adjustable means for precisely controlling the quantities of each of the added materials in accordance with said signal.

References Cited in the file of this patent

UNITED STATES PATENTS

| | | |
|---|---|---|
| 1,851,974 | Bristol | Apr. 6, 1932 |
| 2,428,100 | Soulen | Sept. 30, 1947 |
| 2,623,658 | Johansen | Dec. 30, 1952 |
| 2,626,787 | Harper | Jan. 27, 1953 |